United States Statutory Invention Registration [19]

[11] Reg. Number: H205

Green et al. [43] Published: Feb. 3, 1987

[54] WIDE BANDWIDTH RADAR HAVING IMPROVED SIGNAL TO CLUTTER RESPONSE CHARACTERISTICS

[76] Inventors: George M. Green, 6500 Bear Lake Cir., Orlando, Orange County, Fla. 32810; James R. Ashwell, 2125 Mohawk Trail, Maitland, Orange County, Fla. 32751

[21] Appl. No.: 578,397

[22] Filed: Feb. 9, 1984

[51] Int. Cl.[4] ..... G01S 7/28

[52] U.S. Cl. ..... 342/134

[58] Field of Search ..... 343/5 CE, 5 CF, 5 DD, 343/5 PN, 7 PF, 17.1 PW, 18 E, 351; 343/17.1 R

[56] References Cited

U.S. PATENT DOCUMENTS

| | | | |
|---|---|---|---|
| 2,960,664 | 11/1960 | Brodwin | 343/5 PN |
| 3,149,333 | 9/1964 | Campbell | 343/17.1 R |
| 3,307,183 | 2/1967 | Adam | 343/16 R |
| 3,757,329 | 9/1973 | Sato et al. | 343/5 PN |
| 3,787,857 | 1/1974 | Lazarchik et al. | 343/351 |
| 3,945,012 | 3/1976 | Cooper | 343/17.2 R |
| 3,972,042 | 7/1976 | Johnson | 343/17.2 PC |

OTHER PUBLICATIONS

"Millimeter Wavelength IMPATT Sources", by J. Purcell; *The Radio and Electronic Engineer* (Jul.–Aug. 1979), pp. 347–350.

"Solid State Microwave Noise Radar", by J. Forrest and J. Meeson; Radar '77 conference (London: 25–28, Oct. 1977).

*Primary Examiner*—Thomas H. Tarcza
*Assistant Examiner*—Bernarr Earl Gregory

[57] ABSTRACT

Improved signal to clutter response in a radar is achieved by transmitting broad bandwidth frequency modulated noise pulses. Utilization of millisecond pulse intervals enables the radar video processor to average the independent samples present in each echo pulse so that each pulse represents an estimate of the true average return from the background. The bandwidth of the IF processing circuit is equal to the RF circuit and transmitted pulse bandwidths.

4 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WIDE BANDWIDTH RADAR HAVING IMPROVED SIGNAL TO CLUTTER RESPONSE CHARACTERISTICS

STATEMENT OF GOVERNMENT INTEREST

The invention described herein may be manufactured and used by or for the Government for governmental purposes without the payment of any royalty thereon.

BACKGROUND OF THE INVENTION

This invention relates to radars used to detect and track targets in clutter backgrounds and in particular to a wide bandwidth radar of that type having improved signal to clutter response characteristics.

A need exists to extend the present capability of guided weapons to include all-weather air strike operations against tactical targets. Microwave radiometric guidance techniques provide the potential to strike targets partially obscured by foliage, clouds, or adverse weather. Trackers utilizing these techniques are capable of operating in both active and passive modes.

Past work has shown that passive microwave radiometer techniques can be used to detect and track metal targets in foliage backgrounds even when partially obscured by weather, foliage and camouflage. However, for most tactical warfare applications, detection range is not sufficient and false targets such as pools of water and background variations are a significant problem.

With regard to active mode operation, a class of frequency-agile radar has evolved which uses pulse-to-pulse frequency change to smooth clutter fluctuations. Typically, using spin-tuned magnetrons, these radars achieve detection ranges of greater than 10 miles against targets in sea and terrain backgrounds. In this class of radar the frequency of the transmitted pulse is changed from pulse to pulse and a narrowband receiver is programmed to follow the frequency variation. The primary problem with this approach is the complexity/-cost of the frequency agile transmitter and receiver.

A second active mode approach is to use an FM-CW radar with wide frequency deviation. With this approach, range gating is difficult because sweep linearity must be obtained over a very large frequency range. Also, since it is a CW system, feedthrough of transmitter noise sidebands into the receiver limits system performance.

The present invention relates to active mode operation and specifically to a class of active radars using wide bandwidth to suppress clutter fluctuations from terrain and sea backgrounds and to suppress signal fluctuations and angular glint from complex targets such as tanks. Thus signal-to-clutter ratios are increased such that search, acquisition and guidance can be accomplished for small targets such as tanks in terrain background and small ship/boats at sea.

Compared to the magnetrons used in frequency-agile systems, the solid state transmitter power is very low. However, since radar range has a 4th root dependence on power, ranges usable in missile terminal guidance systems are achievable. The major advantage of the pulsed, wide bandwidth radar over the FM-CW radar approach is the ability to use time gating to discriminate against rain backscatter, system thermal noise, and false or multiple targets.

SUMMARY OF THE INVENTION

The invention comprehends a wide bandwidth radar having improved signal to clutter response characteristics. The approach used to reduce background clutter fluctuations is to chirp each radar pulse by several hundred megahertz. The bandwidth of the receiver IF is made equal to the transmitted bandwidth. Averaging of the clutter fluctuations is acccmplished by the video detector and filter. Each video pulse gives an estimate of the non-fluctuating, average radar cross section of the scene being illuminated.

In one embodiment the technique of the invention is implemented by utilizing a $K_a$-band IMPATT noise generator to generate a train of one millisecond 500 MHz bandwidth, pulses. The radar RF and IF circuits also have 500 HMz bandwidths. A 250 MHz bandwidth video circuit averages the content of each return pulse to provide an estimate of the true average return from background.

It is a principal object of the invention to provide a radar having improved signal to clutter response characteristics.

It is another object of the invention to provide a radar capable of detecting targets in the face of sea or terrain background clutter fluctuations.

It is another object of the invention to provide an active radar with improved signal to clutter response having greater detection range than passive mode systems.

It is another objet of the invention to provide an active radar with improved signal to clutter response and having the ability to utilize time gating to discriminate against rain backscatter, system thermal noise and false multiple targets.

These together with other objects, features and advantages of the invention will become more readily apparent from the following detailed description when taken in conjunction with the illustrative embodiments in the accompanying drawing.

DETAILED DESCRIPTION OF THE PREFERRED EMBODIMENT

In a conventional narrowband radar a pulse is transmitted from the antenna and illuminates the target and a background resolution element as defined by the angular beamwidth of the antenna and the pulsewidth. The return pulse is downconverted in a mixer to an intermedite frequency (IF) and the envelope of the pulse is detected and amplified. Range gating and other video processing is performed on the video pulse train. The IF amplifier bandwidth is approximately the reciprocal of the pulsewidth to obtain maximum receiver sensitivity along with acceptable pulse shape reproduction. The video amplifier bandwidth is approximately one-half of the reciprocal of the pulsewidth, or half the IF bandwidth, also to maintain acceptable pulse shape reproduction. If the radar moves with respect to the background or if the background moves (windblown foliage), the return from the background fluctuates from pulse to pulse because of the random change in phase of return from various parts of the background. In a conventional frequency agile radar the frequency of successive pulses is changed, in steps sufficient to change the phasing of returns from various parts of the terrain, an amount sufficient to obtain an independent sample of the fluctuation. Returns from a number of pulses are then averaged to obtain an estimate of the average return signal amplitude.

In the wide bandwidth radar technique which is the subject of the present invention, each transmitted pulse is frequency modulated or chirped so as to obtain a broad power spectral density. The transmitted pulse illuminates and is reflected from the target and the background patch. The effect of the wide bandwidth modulation on each pulse return from the background is to create a randomly varying amplitude during the pulse interval, which represents a number of independent samples of the clutter fluctuations. An RF and IF bandwidth equal to the transmitted bandwidth is needed to pass the high frequency variations during the pulse interval. The effect of the video detector is to average the independent samples present during each pulse interval so that each pulse represents an estimate of the true average return from the background. The video amplifier bandwidth need be only wide enough to pass the pulse shape.

Figure 1:
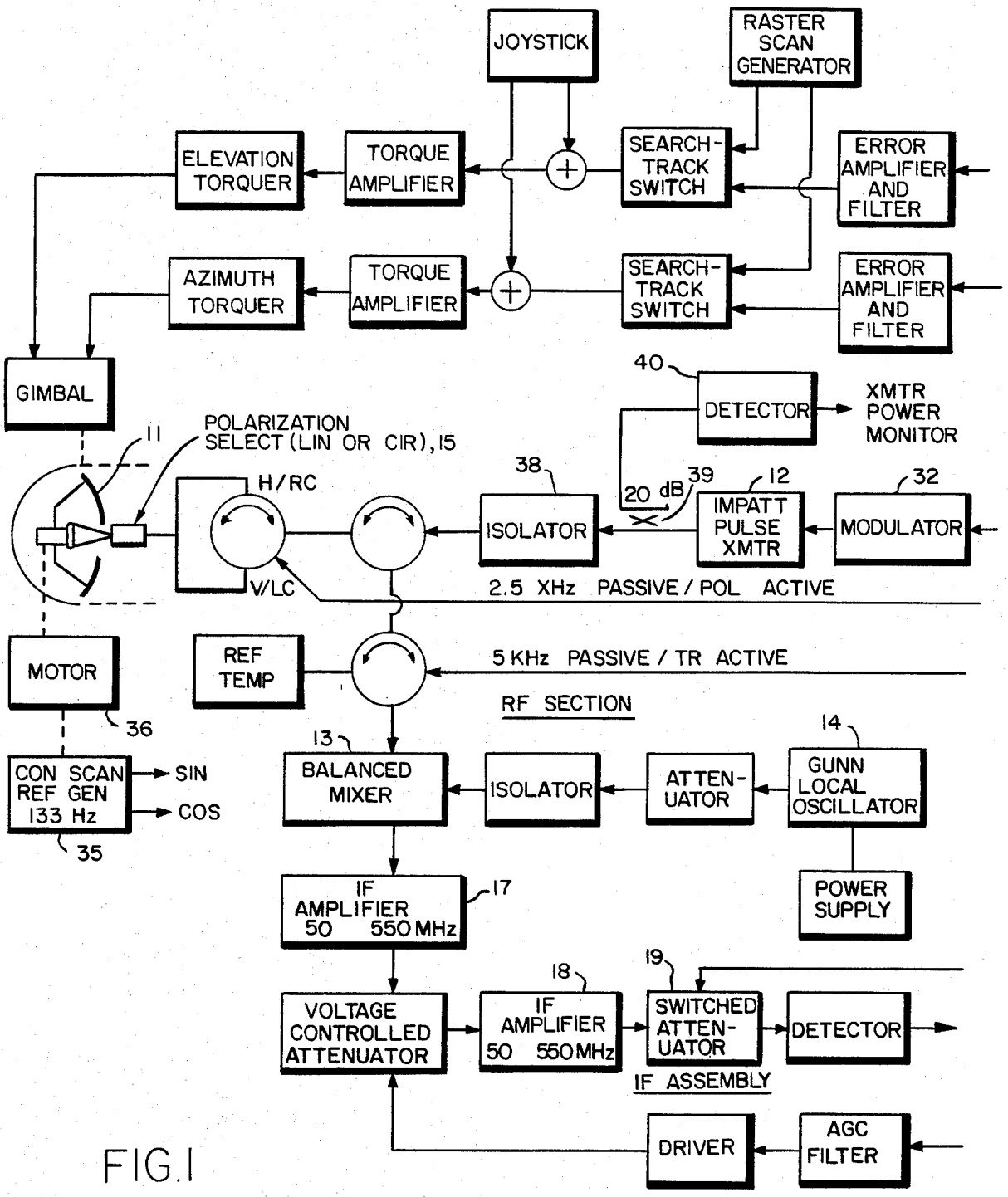
FIG. 1 is a functional block diagram of a polarization agile radar that incorporates one presently preferred embodiment of the invention.
Figure 1:
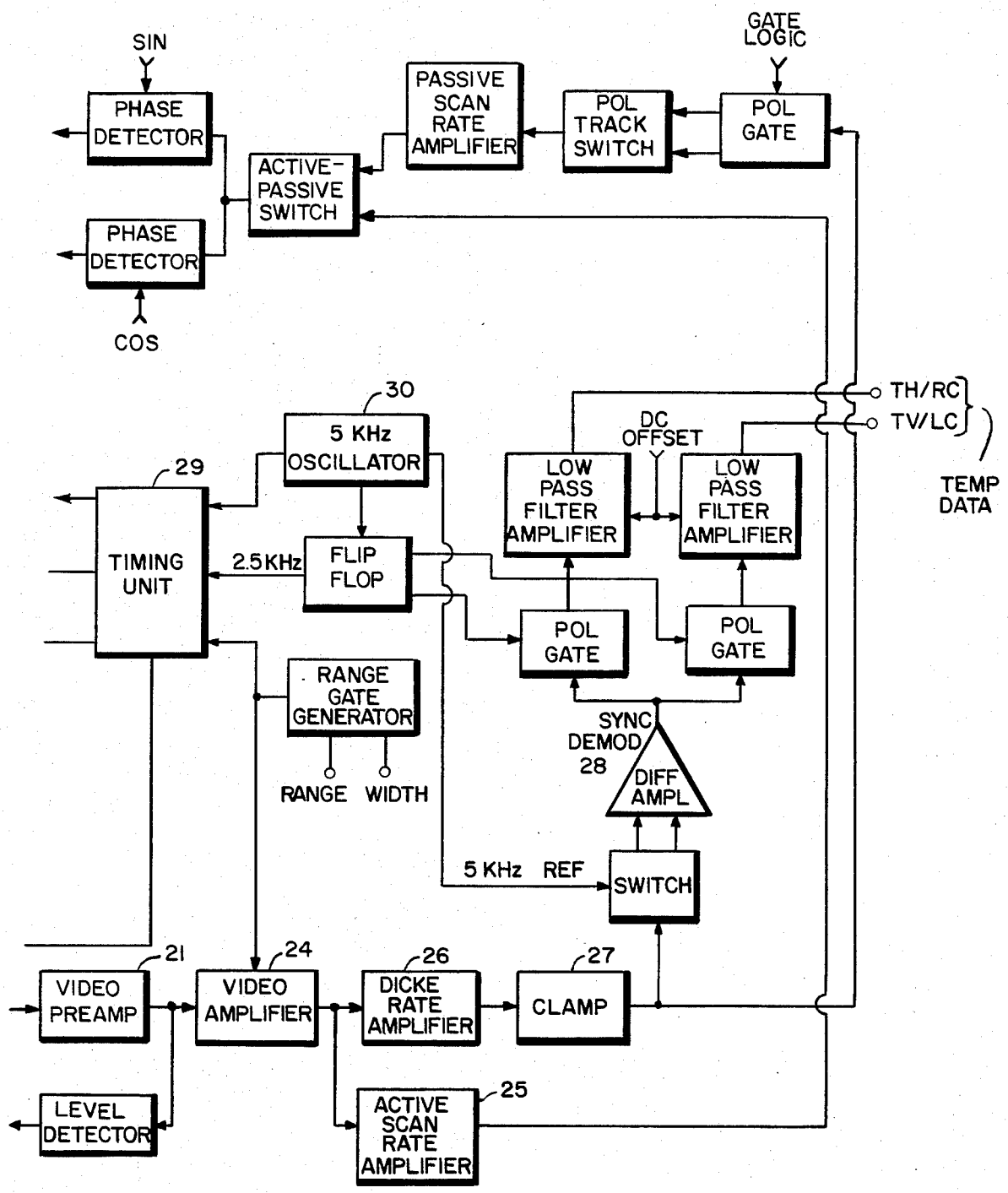

Referring now to FIG. 1 there is illustrated thereby a functional block diagram of a radar that incorporates the present invention. By way of showing a complete radar system certain conventional radar circuits and other features not germane to the present invention are included in the block diagram. However, in general, the following detailed description is limited to those circuits and components necessary to understand and practice the invention.

The Polarization Agile Tracking radar shown in FIG. 1 operates at $K_a$-band. Both active and passive modes are provided. Either linear or circular polarization agility can be selected for both modes. In the active mode which relates to the presently described embodiment of the invention the target is illuminated by a 1.0-microsecond pulse from an IMPATT transmitter whose frequency is swept over a 500-MHz bandwidth. The wide bandwidth suppresses the background clutter fluctuations, thereby enhancing the return signal-to-clutter (S/C) ratio. In the passive mode, the receiver is a wideband Dicke radiometer with a 5-kHz switching frequency that alternately selects and processes the orthogonal components of either linear or circular polarization. In both active and passive modes, closed-loop tracking signals are obtained by phase comparison of the received conical-scan modulated signal with a sine-cosine reference generator attached to the antenna spin motor.

The functional block diagram of the Polarization Agile Radiometer shown in FIG. 1 is considered in terms of main functional areas: the RF assembly, including the antenna 11, transmitter 12, receiver mixer 13, local oscillator (LO) 14, polarization switching unit 15, and other RF components; the IF assembly containing the IF amplifiers 17, 18, AGC attenuator 22, switched attenuator 19, and detector/video preamplifier 20, 21; the electronics circuitry including video and scan rate amplifiers 24, 25, Dicke rate amplifier 26, clamp circuit, synchronous detector, filters, and phase detectors; and, the azimuth and elevation servo tracking loop components.

In the passive mode, RF energy is received from the target by the conical-scan antenna, passes through the polarization switching unit, and is converted to the 50- to 550-MHz IF band by the balanced mixer. The polarization switching unit alternately connects the receiver to the temperature stabilized RF load at a 5-kHz rate and to each of the selected orthogonal polarization components at a 2.5-kHz rate. The reference and wide band received signals are amplified in the IF amplifier, and their amplitude which is modulated by the conical-scan antenna is detected by the detector. The 5-kHz Dicke switched signals are amplified further in the video and Dicke rate amplifiers. Following restoration of the waveform dc level and synchronous detection the orthogonally polarized received signals are separated and filtered to produce the radiometer temperature measurement output. After the orthogonally polarized signals are separated, tracking signals are obtained by amplifying the conical-scan modulation in the scan rate amplifiers. A polarization track switch is provided to select the desired polarization component for closing the tracking loop through the phase detectors.

In the active mode the target is illuminated by the transmitter at a PRF of 5 kHz. The received pulse train, whose amplitude varies with the conical-scan modulation, is converted to IF, amplified, detected, and the conical-scan tracking modulation extracted for comparison in the phase detectors. Essentially the same receiver RF and IF components are used in the active and passive modes. The major difference between the two is the switching and gating that is accomplished to isolate the transmitter and receiver.

The basic timing pulses for the transmitter and receiver are produced by a 5-kHz oscillator 30 in the timing unit 29. To blank the receiver during the transmit pulse, the timing unit sends a trigger pulse to the polarization switching unit 15 and switched attenuator. During the blanking pulse the polarization switching unit switches the receiver to the temperature stabilized load, thereby introducing 20 dB of additional isolation to protect the mixer crystals. At the same time, the timing unit switches the switched IF attenuator 19 into the high attenuation state to blank the detector and video circuits. After the receiver is blanked, a delayed trigger pulse causes the modulator 32 to pulse the IMPATT transmitter 12.

The $K_a$-band IMPATT oscillator produces a 1-microsecond wide burst of noise having a bandwidth of approximately 500 MHz. This pulse passes through the polarization switching unit and is radiated by the antenna 11.

The transmitter leakage that enters the balanced mixer will cause the last IF amplifier to saturate. The switched attenuator prevents the saturated output from reaching the detector.

After the transmitter pulse occurs, the polarization switching unit connects the receiver to the selected polarization port. The saturation recovery time of the IF amplifiers 17, 18 is less than 1 microsecond which, together with the switching time of the polarization switching unit and switched attenuator, results in a minimum receiver recovery time of about 1.5 microseconds.

At close range, large target returns are maintained at a constant level at the output of the video preamplifier 24 by the AGC circuit. The AGC attenuator provides an AGC range in excess of 50 dB.

The antenna is an 11-inch diameter Cassegrain that is con-scanned by rotating a tilted subreflector. A single spar supports the spin motor 36 which rotates at 8000 RPM. The sine-cosine phase reference required to process the received conical-scan modulated signal is provided by the reference generator 25 attached to the rear shaft of the motor. A solenoid located directly behind the dish rotates a polarizing section of the circular waveguide feed to produce either circular or linear polarization.

The $K_a$-band IMPATT Transmitter 12 is a solid state IMPATT oscillator that is pulsed on by a transistorized modulator. The transmitter operates at PRF of 5 kHz and a pulsewidth of 1.0 microsecond. The peak power output is about 1 watt, with the 0.005 duty cycle resulting in an average power of 5 milliwatts.

Load variations and reflections are prevented from affecting the oscillator by using an isolator IF between the transmitter and the polarization switching unit. A 20-dB directional coupler 39 and crystal detector 40 are used to monitor transmitter power output and pulse shape.

Figure 2:
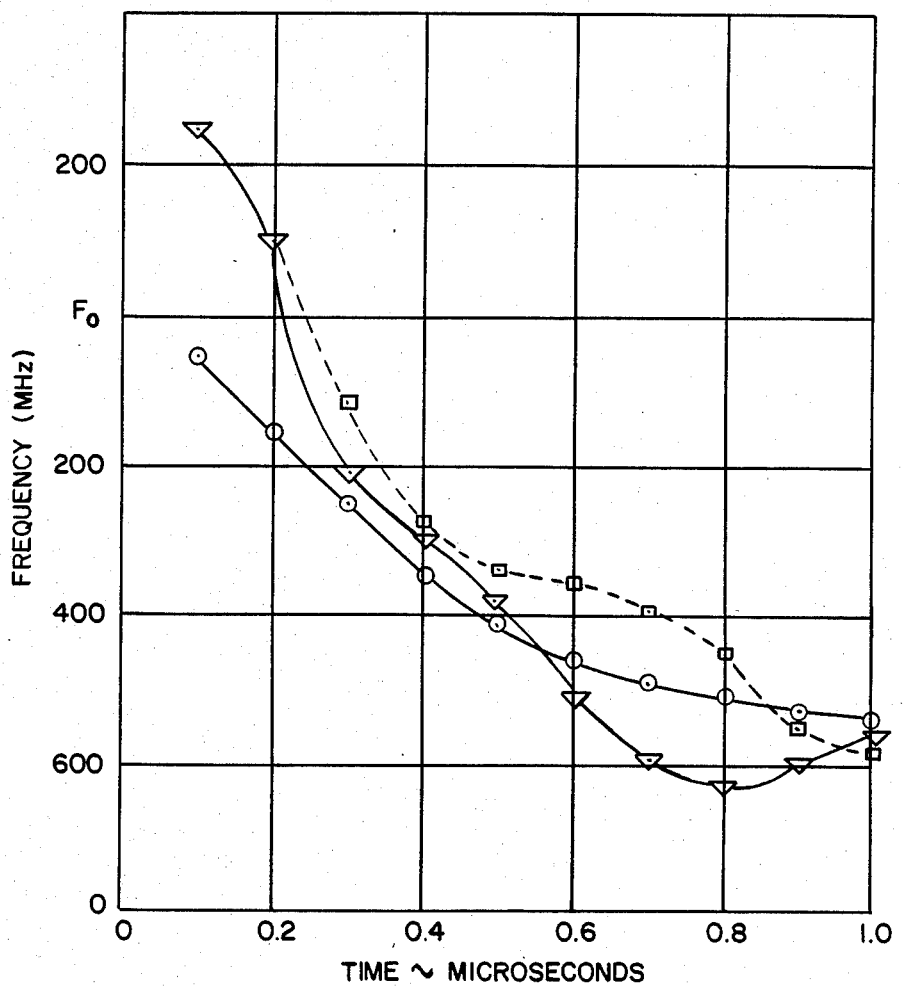
FIG. 2 is a graph illustrating frequency modulation of the type IMPATT oscillator utilized in implementing the invention.

FIG. 2 shows how the transmitted frequency of three different IMPATT diodes changes during the pulse. The bandwidth of the transmited pulse from each diode is greater than 500 MHz. The first 100 ns of the transmitted pulse is very noisy. Then the frequency tends to chirp downward and stabilizes at the end of the pulse.

Figure 3:
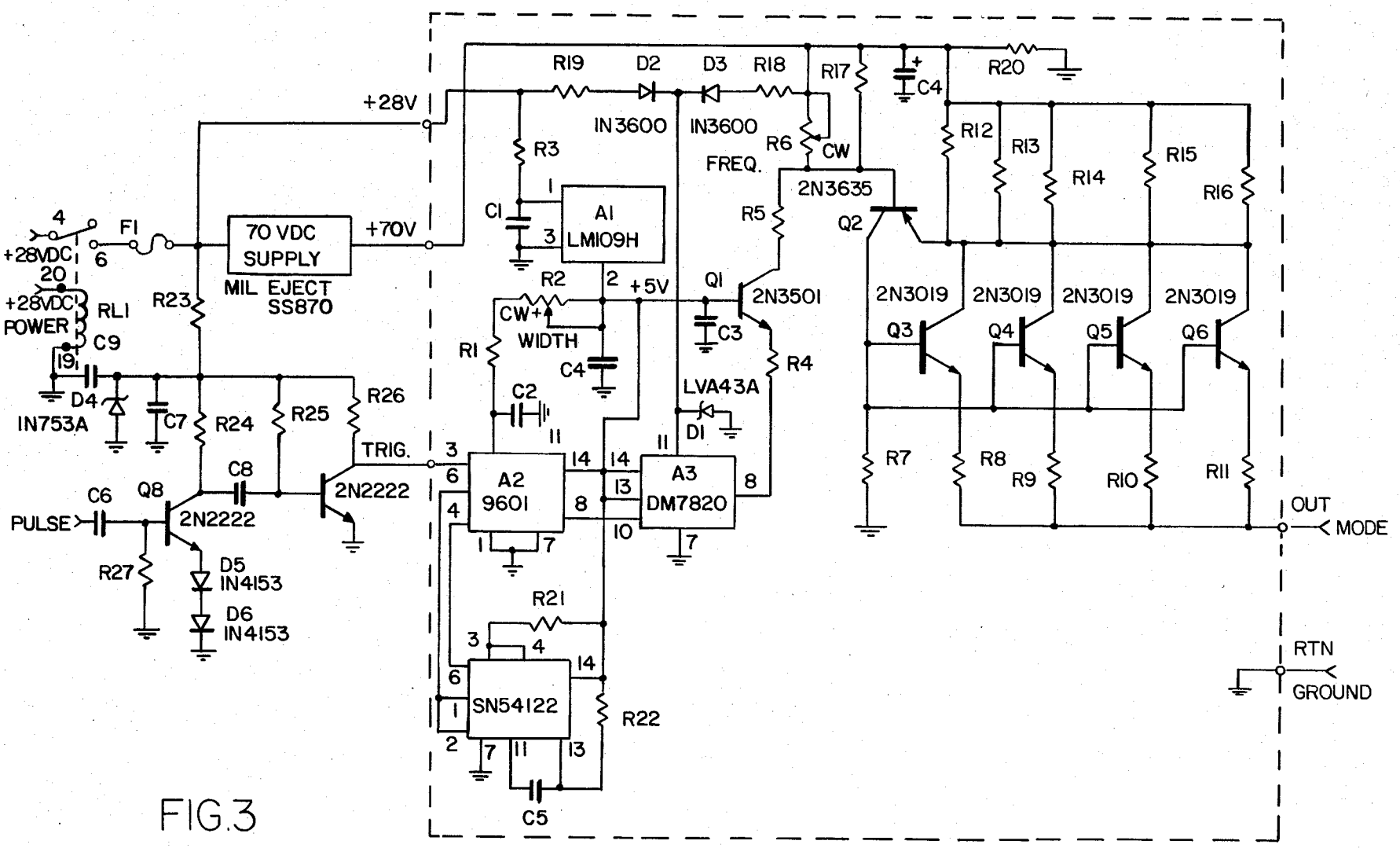
FIG. 3 is a schematic diagram of the IMPATT modulator utilized in implementing the invention.

The modulator 32 provides the driving pulse for the IMPATT oscillator 12. Power for the modulator is obtained from the +28 vdc supply and from a +70 vdc solid-state dc-to-dc power supply (not shown). The schematic diagram of the modulator is shown in FIG. 3.

In operation, a +5 volt transmit trigger pulse from Timing Unit 29 is applied to the base of Q8 which is used to provide immunity against input noise transients that are less than 1.5 volts. The negative going pulse at the collector of Q8 is inverted by Q7 and used to trigger the 9601 monostable multivibrator (A2). The width of the resulting +3 volt pulse at pin 8 is set for 1.0 microsecond by adjusting R2.

Additional noise-trigger immunity is provided by the monostable multivibrator A4 which produces a gating pulse to prevent A2 from being retriggered within 100 microseconds. This limits the modulator pulse rate to 10 kHz to protect the IMPATT diode from burn-out.

The positive pulse at the output of the monostable multivibrator (A2) is applied to the strobe input (pin 10) of the DM7820 line receiver (A3). Because both inputs (pins 11 and 13) are high, the strobe causes the output at pin 8 to change from a high to a low. This turns on Q1 since its base is held at a constant +5.0 vdc by the LM109H voltage regulator (A1). Turning on Q1 causes collector current to flow, putting a negative-going pulse on the base of Q2 causing it to conduct. The voltage at the base of the parallel-connected 2N3019 transistors rises to approximately 40 volts. This applies a 40-volt, 1.6-ampere pulse to the IMPATT oscillator. The pulse current is maintained constant by the current feedback action of Q2. The output frequency of the IMPATT oscillator can be varied by adjusting the pulse current with R6. Turning the adjustment screw clockwise increases the current.

Since the modulator output circuit is extremely rugged, the parallel-connected transistors can drive a short circuit load without damage.

The Gunn LO 14 is a small solid-state device that provides the oscillator signal for the balanced mixer. It is mechanically tuned to $F_o$ GHz and has a power output of 18 milliwatts. A resistive attenuator reduces the output power to a 3.0-milliwatt level to drive the mixer diodes. In addition to the resistive attenuator, an isolator is provided between the oscillator and mixer to supply additional decoupling.

The Gunn LO operates from a 5.0-volt, 500-milliampere regulated power supply.

The Mixer and IF Preamplifier are combined in an integral unit that converts the received RF signal into the 50- to 550-MHz IF band. In the mixer 13, two matched diodes in separate holders are driven from an H Plane Tee to form a balanced configuration for cancelling LO noise. The diode holders are fabricated by an electroforming process that enables the inside dimensions to be precisely controlled. Gold plating is used on the inside surfaces to reduce loss. The IF output is brought out of each mixer through a low capacity RF choke.

The IF Preamplifier is noise-matched to the mixer IF output. Its gain is 16 dB over the 50 to 550 MHz band with a maximum noise figure of 2.5 dB.

The measured double sideband noise figure of the Mixer and IF Preamplifier is 7.5 dB with an LO drive level of 3.0 milliwatts.

Figure 4:
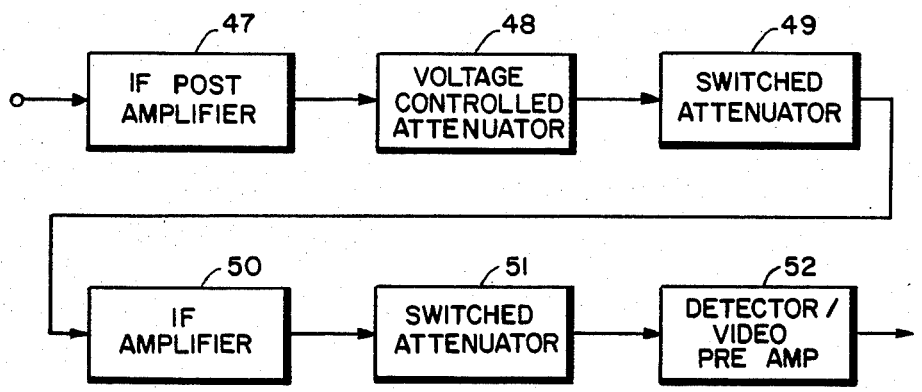
FIG. 4 is a block diagram of the IF circuit of FIG. 1.

The IF Assembly is illustrated in block diagram form in FIG. 4. It includes the IF post-amplifier 47, AGC attenuator 49, IF amplifier 50, switched attenuator 51, and the detector/video preamp 52. All units are separate, fully shielded, and interconnected by semirigid coaxial. This assembly amplifies the IF sigals, provides the switching and AGC action necessary to keep transmitter leakage and strong signal returns from saturating the video circuits, and detects and amplifies the conical-scan modulation on the return signal.

The first IF amplifier 17 consists of a preamplifier that is in integral component of the mixer and in IF Post-Amplifier located on the IF assembly. The IF Post-Amplifier increases the IF signal level by 20 dB to prevent the AGC attenuator from affecting the receiver noise figure.

The AGC Attenuator is used in the active mode to prevent large, close-in target returns from saturating the second IF amplifier and video circuits. It is a passive device using PIN diodes. Insertion loss is typically 1.8 dB, and the attenuation changes linearly over a 40-dB range as the AGC voltage is varied from 1 to 5 volts. Speed of response is on the order of 10 dB per microsecond.

An additional 30 dB of gain is provided by the second IF amplifier 18. This raises the noise power of the radiometer to a value that is sufficient to operate the detector. In the active mode, leakage from the transmitted pulse is allowed to saturate this amplifier. Its recovery time is designed to be less than 1 microsecond to maintain a minimum range capability of 1000 feet.

The Switched Attenuator is only used in the Active Mode. It prevents the transmitter leakage pulse from entering the IF amplifier and detector. Its operation is controlled by the timing unit which turns it on at the end of the transmitter pulse The Switched Attenuator is a double-balanced mixer that is operated as an attenuator. It is turned on by inserting a dc control current into the I port. Insertion loss in the ON state is approximately 2 dB, and by removing the current, 35 to 40 dB of attenuation is obtained. The attenuator can be switched on or off in 10 nanoseconds.

The detector and video preamplifier are integrated together in a single unit. The detector is operated in the square-law region in both the Active and Passive Modes. Tangential sensitivity of the detector is on the order of −53 dBm for the 5-MHz video bandwidth. The detector operates in the square law region at input power levels up to −10 dBm. This results in a possible 40-dB dynamic range for square law operation.

The video pulse train can be processed using conventional video techniques such a pulse integration and range gating. Observing the bandwidth limitations stated, the technique can be used at any frequency band and in either monopulse or conical scan radars.

The technique is not restricted with regard to RF frequency of operation but performance depends on the implementation (power, bandwidth, antenna beamwidth, etc). The technique is usable in both conical scan and monopulse trackers.

The key advantages of the invention are that it obtains clutter fluctuation reduction without the complexity of a conventional frequency agile radar, and can be much more easily range gated than an FM-CW radar. Range gating is needed to discriminate against rain backscatter and limit the size of the background patch in order to discriminate against background variation and false or multiple targets. For missile seeker applications, this approach results in the least possible complex radar implementation with adequate performance.

While the invention has been described in its preferred embodiment it is understood that the words which have been used are words of description rather than words of limitation and that changes within the purview of the appended claims may be made without departing from the scope and spirit of the invention in its broader aspects.

What is claimed is:

1. A wide bandwidth radar having improved signal to clutter response comprising a radar signal pulse generating means generating a train of wide bandwidth non-coherent pulses, modulation means effecting wide bandwidth frequency modulation of said non-coherent pulses, transmit/receive means transmitting said train of frequency modulated pulses and receiving echo signals thereof, a wide bandwidth IF circuit providing IF processing of said received echo signals, and a video circuit including a detector means receiving said IF processed echo signals said detector means being effective to average the contents of each pulse thereof whereby each averaged pulse represents an estimate of the true average return from background clutter.

2. A wide bandwidth radar as defined in claim 1 wherein the bandwidth of said transmitted pulses and the bandwidth of said IF processing circuit are substantially equal.

3. A wide bandwidth radar as defined in claim 2 wherein said modulator means effects a broad power spectral density, in said transmitted pulses and a randomly varying amplitude during the pulse interval of each echo signal pulse.

4. A wide bandwidth radar as defined in claim 3 wherein said radar signal pulse generating means comprises a $K_a$ band IMPATT noise generator producing approximately 1 microsecond pulses having a bandwidth of approximately 500 MHz, said IF circuit has a bandwidth of approximately 500 MHz and said video circuit has a bandwidth of approximately 250 MHz.

* * * * *